(12) United States Patent
Kusaura

(10) Patent No.: US 9,706,784 B2
(45) Date of Patent: *Jul. 18, 2017

(54) ROASTED COFFEE BEANS

(71) Applicant: KAO CORPORATION, Chuo-ku (JP)

(72) Inventor: Tatsuya Kusaura, Saitama (JP)

(73) Assignee: KAO CORPORATION, Chuo-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,083

(22) Filed: Sep. 6, 2013

(65) Prior Publication Data

US 2014/0010942 A1 Jan. 9, 2014

Related U.S. Application Data

(63) Continuation of application No. PCT/JP2012/055664, filed on Mar. 6, 2012.

(30) Foreign Application Priority Data

Mar. 7, 2011 (JP) .................................. 2011-048994
Nov. 25, 2011 (JP) .................................. 2011-257233

(51) Int. Cl.
  *A23F 5/20* (2006.01)
  *A23F 5/10* (2006.01)
  *A23F 5/04* (2006.01)
  *A23F 5/16* (2006.01)

(52) U.S. Cl.
  CPC .................. *A23F 5/10* (2013.01); *A23F 5/04* (2013.01); *A23F 5/16* (2013.01)

(58) Field of Classification Search
  CPC ...... A23V 2250/028; A23V 2250/2108; A23F 5/04; A23F 5/10; A23F 5/24; A23F 5/18
  See application file for complete search history.

(56) References Cited

U.S. PATENT DOCUMENTS

| | | | |
|---|---|---|---|
| 3,640,726 A | 2/1972 | Bolt et al. | |
| 8,318,228 B2 * | 11/2012 | Shigeno et al. | 426/432 |
| 2008/0113077 A1 | 5/2008 | Leloup et al. | |
| 2008/0193625 A1 | 8/2008 | Kawamura et al. | |
| 2010/0255166 A1 | 10/2010 | Nagao et al. | |
| 2010/0323082 A1 | 12/2010 | Shigeno et al. | |
| 2012/0328762 A1 | 12/2012 | Shigeno et al. | |
| 2013/0243930 A1 | 9/2013 | Kusaura | |

FOREIGN PATENT DOCUMENTS

| | | |
|---|---|---|
| CN | 101223930 A | 7/2008 |
| EP | 1 038 445 A2 | 9/2000 |
| EP | 1 038 445 A3 | 9/2000 |
| EP | 2 119 368 A1 | 11/2009 |
| EP | 2 556 752 | 2/2013 |
| JP | 1-206955 A | 8/1989 |
| JP | 04-360646 | 12/1992 |
| JP | 2000-342182 A | 12/2000 |
| JP | 2003-144050 A | 5/2003 |
| JP | 2004-121138 A | 4/2004 |
| JP | 2005-058061 | 3/2005 |
| JP | 2006-191925 A | 7/2006 |
| JP | 412560 | 9/2007 |
| JP | 2007-282571 | 11/2007 |
| JP | 2008-048728 | 3/2008 |
| JP | WO 2008078843 * | 7/2008 ............... A23F 5/10 |
| JP | 2008-178399 A | 8/2008 |
| JP | 2008-535506 | 9/2008 |
| JP | 2009-028013 | 2/2009 |
| JP | 2009-515547 A | 4/2009 |
| JP | 2009-153426 A | 7/2009 |
| JP | 2011-055716 | 3/2011 |
| JP | 2011-182749 | 9/2011 |
| JP | 2012-183035 A | 9/2012 |
| WO | WO 2005/011396 A1 | 2/2005 |
| WO | WO 2006/080334 A1 | 8/2006 |
| WO | WO 2007/057860 A2 | 5/2007 |
| WO | WO 2007/057860 A3 | 5/2007 |
| WO | WO 2011/122660 A1 | 10/2011 |

OTHER PUBLICATIONS

Spiller, Gene S. Caffeine, CRC Press LLC, 1998, pp. 114.*
King, John, Harvey Wickes Felter and John Uri Lloyd, King's American Dispensatory, vol. 1, 1905, p. 382. https://books.google.com/books?id=xqkMAAAAYAAJ&pg=PA382&dq=hydroquinone+and+roasting+and+coffee&hl=en&sa=X&ei=Y5lmVfHjGcHbsATq2YGADA&ved=0CD4Q6AEwAw#v=onepage&q=hydroquinone%20and%20roasting%20and%20coffee&f=false.*
International Search Report issued in PCT/JP2012/055664 on Jun. 12, 2012.
TA McDonald, et al., "Hypothesis: Phenol and hydroquinone derived mainly from diet and gastrointestinal flora activity are casual factors in leukemia", Leukemia, vol. 15, 2001, pp. 10-20.
Kazuyuki Hiramoto, et al., Identification of hydroxyhydroquinone in coffee as a generator of reactive oxygen species that break DNA single strands, Mutation Research, vol. 419, 1998, pp. 43-51.
Shizuku Coffee Thesaurus (Drop Coffee Glossary), http://www.cafe-iko.net/04/dic-02j-ai02.htm, 2009, 1 page with unedited computer-generated English translation.
Extended European Search Report issued Jul. 24, 2014 in Patent Application No. 12754639.8.

(Continued)

*Primary Examiner* — Jill Warden
*Assistant Examiner* — Hong T Yoo
(74) *Attorney, Agent, or Firm* — Oblon, McClelland, Maier & Neustadt, L.L.P.

(57) ABSTRACT

Provided is a process for producing roasted coffee beans, which are useful as a starting material for a coffee beverage having a suppressed unpleasant taste and have a roast degree within a predetermined level or less. The process for producing roasted coffee beans of the present invention comprises placing starting material roasted coffee beans having an L value of from 21 to 50 in an airtight container and subjecting the roasted coffee beans to a heat treatment at from 100 to 160° C.

19 Claims, No Drawings

(56) References Cited

OTHER PUBLICATIONS

Chahan Yeretzian, et al., "Analysing the headspace of coffee by proton-transfer-reaction mass-spectrometry", International Journal of Mass Spectrometry, vol. 223-224, XP004396989, (Jan. 15, 2003), pp. 115-139.
"List of roasting coffee bean" Coffee Freaks, http://navigater.info/coffee/knowledge/roast.html, Published in 2010, Searched on Jul. 16, 2015, 5 Pages (with unedited computer generated English translation).
Agricultural Chemistry, 39 (2), pp. 66-70, Feb. 1965 (with computer translation).
T. Nakabayashi et al, Nippon Shokuhin Kogyo Gakkaishi, vol. 22, No. 11, 1975, pp. 545-548 (with computer translation).

\* cited by examiner

ROASTED COFFEE BEANS

FIELD OF THE INVENTION

The present invention relates to roasted coffee beans.

BACKGROUND OF THE INVENTION

Coffee beverages contain chlorogenic acids, a kind of polyphenol, such as chlorogenic acid, coffeic acid and ferulic acid. The chlorogenic acids are reported to have excellent physiological activities such as an hypotensive effect. Increasing the ingestion of chlorogenic acids is efficient to allow the physiological activities to be sufficiently exhibit.

Green coffee beans contain a large amount of chlorogenic acids; however, coffee beverages obtained from green coffee beans do not have the proper coffee taste and flavor. In contrast, coffee beverages obtained from roasted coffee beans have good coffee taste and flavor; however, an amount of chlorogenic acids is reduced by roasting.

Therefore, as a coffee product which contains chlorogenic acids at a high concentration and has good coffee taste and flavor, for example, proposed is a coffee product obtained by grinding a mixture containing green coffee beans and roasted coffee beans in a predetermined ratio, and then subjecting the mixture to extraction and drying (Patent Document 1). Furthermore, proposed is a packaged coffee beverage, in which coffee extracts obtained from dark roasted coffee beans and light roasted coffee beans are mixed and the ratio of chlorogenic acids to tannin and the ratio of dichlorogenic acids to chlorogenic acids are controlled to fall within specific ranges (Patent Document 2). Moreover, a process for producing coffee beans reduced in the content of hydroxyhydroquinone, which inhibits the hypotensive effect of chlorogenic acids, is proposed (Patent Document 3).

CITATION LIST

Patent Document

[Patent Document 1] JP-A-2008-535506
[Patent Document 2] JP-B-4012560
[Patent Document 3] JP-A-2008-048728

SUMMARY OF THE INVENTION

The present invention provides a process for producing roasted coffee beans, comprising placing starting material roasted coffee beans having an L value of from 21 to 50 in an airtight container and subjecting the roasted coffee beans to a heat treatment at from 100 to 160° C.

The present invention also provides roasted coffee beans having an L value of more than 20 to 38 or less, (A) a content of hydroquinone of 7.1 mg or more per kg of the roasted coffee beans, and (B) a content of hydroxyhydroquinone of 50 mg or less per kg of the roasted coffee beans.

DETAILED DESCRIPTION OF THE INVENTION

Coffee taste and flavor include, e.g., acidity, bitterness and sweetness. The coffee taste and flavor is brought from a balance between these tastes, and characterized by roasted coffee beans used in production. The present inventor conducted studies. As a result, he found that in a coffee beverage prepared by using dark roasted coffee beans and green coffee beans, or dark roasted coffee beans and light roasted coffee beans, as described in Patent Documents 1 and 2, the blending and processing conditions need to be limited to some extent in order to satisfy both taste and flavor and stability during storage, and that if green coffee beans or light roasted coffee beans are used in predetermined amount or more, it gives an uncomfortable feeling to aftertaste.

Then, the present inventor conducted more specific studies. As a result, he found that the uncomfortable aftertaste is attributed to unpleasant taste brought when green coffee beans and light roasted coffee beans are used in production. Herein, the "unpleasant taste" used in the specification refers to foreign taste remaining after drinking and disrupting the taste and flavor balance intrinsic to roasted coffee beans.

The present invention provides roasted coffee beans, which are useful as a starting material for a coffee beverage suppressed in unpleasant taste and have a roast degree within a predetermined level or less, and a process for producing the same.

The present inventor, based on the hypothesis that any component in light roasted coffee beans involves with unpleasant taste, produced roasted coffee beans by subjecting light roasted coffee beans as a starting material to various treatments and analyzed them. As a result, he found that unpleasant taste is suppressed by applying a heat treatment within a specific temperature range.

The present inventor analyzed components of the roasted coffee beans based on these findings. As a result, he found that it is effective to control the amounts of hydroquinone and hydroxyhydroquinone in light roasted coffee beans to obtain a coffee beverage suppressed in unpleasant taste attributed to light roasted coffee beans, and accomplished the present invention.

According to the present invention, it is possible to provide roasted coffee beans, which are useful as a starting material for a coffee beverage suppressed in unpleasant taste and have a roast degree suppressed within a predetermined level or less. The roasted coffee beans of the present invention contain chlorogenic acids at a high concentration and can be suitably used as roasted coffee beans for enhancing the amount of chlorogenic acids in a blend coffee beverage.

Furthermore, according to the present invention, it is possible to efficiently produce such roasted coffee beans in a simple operation.

First, a process for producing the roasted coffee beans of the present invention will be described.

The starting material roasted coffee beans to be used in the present invention are light roasted coffee beans having an L value of from 21 to 50. In view of suppressing unpleasant taste, the upper limit of the L value is preferably 48 and more preferably 46; whereas the lower limit thereof is preferably 22, more preferably 25, more preferably 30 and more preferably 31 and even more preferably 33. The range of the L value of the starting material roasted coffee beans is preferably from 22 to 50, more preferably from 25 to 50, more preferably from 30 to 50, more preferably from 30 to 48, more preferably from 31 to 48, more preferably from 31 to 46 and even more preferably from 33 to 46. Herein the "L value" in the specification is defined as a lightness value of roasted coffee beans measured by a color difference meter, provided that the L value of black is regarded as 0 and the L value of white is regarded as 100.

The starting material roasted coffee beans may be used singly or in a mixture of two or more. In the present invention, two or more of coffee beans different in roast degree may be used as a mixture. When two or more of coffee beans different in roast degree are used as a mixture, the L value of the starting material roasted coffee beans is determined by multiplying the L value of each of the roasted coffee beans by its content ratio and then summing up the resulting product. Furthermore, if the L value of the starting material roasted coffee beans thus calculated falls within the above range, roasted coffee beans having a roast degree outside the above range may be used.

As the starting material roasted coffee beans, roasted green coffee beans or commercially available product may be used.

A method of roasting coffee beans is not particularly limited and a known method may be appropriately selected. For example, the roasting temperature is preferably from 180 to 300° C., more preferably from 190 to 280° C. and even more preferably from 200 to 280° C. The heating time may be appropriately set so as to obtain a desired roast degree. Furthermore, examples of roasters which may be used include a roaster for roasting beans kept unmoved, a roaster for roasting beans while transferring and a roaster for roasting beans while stirring or the like. More specifically, a shelf dryer, a conveyer dryer, a rotary-drum dryer and a rotary V-type dryer or the like are mentioned. As a heating system, a direct heating system, a hot-air system, a half-hot air system, a far-infrared ray system, an infrared ray system, a microwave system, a superheated steam system or the like are mentioned.

Furthermore, the kind of coffee beans is not particularly limited, for example, *Coffea Arabica*, *Coffea Robusta* and *Coffea Liberica* and the like are mentioned. Furthermore, the production region of coffee beans, for example, includes Brazil, Colombia, Tanzania, Mocha, Kilimanjaro, Mandheling, Blue Mountain and Guatemala and the like. These coffee beans may be used singly or as a blend of a plurality of kinds.

Furthermore, the starting material roasted coffee beans may be ground or not ground. The size of ground starting material roasted coffee beans may be appropriately selected; however, the roasted coffee beans which pass through a 12-mesh Tyler standard sieve and do not pass through a 115-mesh Tyler standard sieve are preferable.

In the present invention, as the starting material roasted coffee beans, roasted coffee beans having an L value higher than a desired L value are used. For example, starting material roasted coffee beans having an L value larger by 5 to 10 than a desired L value is preferably selected. More specifically, when roasted coffee beans having an L value of about 30 are desired, starting material roasted coffee beans having an L value of 35 to 40 are preferably used.

The L value of the roasted coffee beans produced by the present invention is preferably more than 20 and 38 or less. In view of suppressing unpleasant taste, the upper limit thereof is preferably 35, more preferably 33 and even more preferably 31; whereas the lower limit thereof is preferably 20.1, more preferably 20.5, more preferably 26 and even more preferably 28. As the range of the L value of the roasted coffee beans produced, it is preferably from 20.1 to 38, more preferably from 20.2 to 38, more preferably from 20.5 to 38, more preferably from 25 to 38, more preferably from 26 to 35, more preferably from 26 to 33, more preferably from 28 to 33 and even more preferably from 28 to 31.

Furthermore, in the present invention, starting material roasted coffee beans are subjected to a heat treatment with being placed in an airtight container. In this manner, it is possible to increase the amount of (A) hydroquinone and decrease the amount of (B) hydroxyhydroquinone while maintaining the amount of (C) chlorogenic acids.

The airtight container is not particularly limited as long as it shuts out contact with an ambient air. Examples thereof include a retort pouch, a can and a bottle. Furthermore, the shape and material of the airtight container is not particularly limited. When a heat treatment is performed by use of an autoclave described later, a pressure-resistant container is preferably used.

The internal volume of the airtight container is usually from 2 to 30 times and preferably from 3 to 20 times as large as the bulk volume of starting material roasted coffee beans; however, the internal volume may be appropriately set, depending on the L value of the starting material roasted coffee beans to be used. For example, when starting material roasted coffee beans having an L value of from 30 to 50 are used, the ratio of the internal volume of an airtight container relative to the bulk volume of the starting material roasted coffee beans is usually from 2 to 30 times, preferably from 3 to 20 times and even more preferably from 4 to 10 times. The conditions are suitable for producing roasted coffee beans having an L value of from 25 to 38 (hereinafter also referred to as a "first roasted coffee beans"). Furthermore, when starting material roasted coffee beans having an L value of 21 or more and less than 30 are used, the ratio of the internal volume of the airtight container relative to the bulk volume of the starting material roasted coffee beans is usually from 2 to 30 times, preferably from 4 to 25 times, more preferably from 5 to 20 times and even more preferably more than 10 times to 20 times or less. The conditions are suitable for producing roasted coffee beans having an L value of more than 20 and less than 25 (hereinafter also referred to as a "second roasted coffee beans").

As described above, as the airtight container, an airtight container having a predetermined spatial volume in the container when starting material roasted coffee beans are placed is suitably used.

Presence of oxygen in the airtight container before a heat treatment is preferable, and atmospheric air is more preferable.

The heating temperature is from 100 to 160° C. The upper limit thereof is preferably 155° C., more preferably 150° C., more preferably 145° C. and even more preferably 140° C.; whereas, the lower limit thereof is preferably 110° C., more preferably 115° C. and even more preferably 120° C. As the range of heating temperature, it is preferably from 110 to 155° C., more preferably from 115 to 150° C., more preferably from 120 to 150° C., more preferably from 120 to 145° C. and even more preferably from 120 to 140° C.

As the heating apparatus, for example, an autoclave or a drier to which heat can be applied may be used. For the atmosphere during heating, either atmospheric air or an inert gas atmosphere such as nitrogen may be employed.

The heating time is preferably from 0.5 to 4 hours, more preferably from 1 to 3 hours and even more preferably 1 to 2 hours. The heating time herein is specified as the lapse time after an airtight container is charged into a heating apparatus in the case where the heating apparatus is previously heated to a desired temperature. Alternatively, in the case where the temperature is raised after an airtight container is charged into the heating apparatus, the heating time is specified as the lapse time after the temperature of the heating apparatus reaches to a desired temperature.

The heat treatment may be carried out under a normal pressure or an elevated pressure. When an autoclave is used, the pressurization conditions, as a gauge pressure, are preferably from 0.14 to 0.15 MPa, more preferably from 0.141 to 0.148 MPa and even more preferably from 0.141 to 0.145 MPa.

After the heat treatment, the airtight container is taken out from the heating apparatus and cooled to preferably from 0 to 100° C. and more preferably from 10 to 60° C., within 30 minutes. After cooling, roasted coffee beans are taken out from the airtight container to obtain the roasted coffee beans of the present invention.

In the roasted coffee beans of the present invention, an L value is usually more than 20 and 38 or less and the content of (A) hydroquinone is 7.1 mg or more per kg of the roasted coffee beans, and the content of (B) hydroxyhydroquinone per kg of the roasted coffee beans is 50 mg or less. The L value of the roasted coffee beans is preferably from 20.1 to 38, more preferably from 20.2 to 38, more preferably from 20.5 to 38, more preferably from 25 to 38, more preferably from 26 to 35, more preferably from 26 to 33, more preferably from 28 to 33 and even more preferably from 28 to 31. Furthermore, the content of (A) hydroquinone per kg of the roasted coffee beans is preferably 8 mg or more, more preferably 9 mg or more and more preferably 10 mg or more. In view of a balanced taste and flavor, the upper limit thereof is preferably 50 mg, more preferably 45 mg, more preferably 30 mg and even more preferably 28 mg. Furthermore, the content of (B) hydroxyhydroquinone per kg of the roasted coffee beans is preferably 40 mg or less, more preferably 38 mg or less, more preferably 35 mg or less, more preferably 30 mg or less and even more preferably 25 mg or less. Note that the lower limit thereof may be 0. In view of a balanced taste and flavor, the lower limit thereof is 0.1 mg, more preferably 0.5 mg and even more preferably 1 mg.

Furthermore, in the roasted coffee beans of the present invention, the mass ratio of (A) hydroquinone and (B) hydroxyhydroquinone, [(B)/(A)], is 5 or less, more preferably 4 or less, more preferably 3 or less and even more preferably 2 or less. Note that the lower limit thereof is not particularly limited and may be 0. In view of a balanced taste and flavor, the lower limit thereof is preferably 0.01, more preferably 0.05 and even more preferably 0.1. Furthermore, in the roasted coffee beans of the present invention, the mass ratio of (B) hydroxyhydroquinone and (C) chlorogenic acids, [(B)/(C)], is preferably $20 \times 10^{-4}$ or less, more preferably $14 \times 10^{-4}$ or less, more preferably $12 \times 10^{-4}$ or less, more preferably $8.5 \times 10^{-4}$ or less, more preferably $8 \times 10^{-4}$ or less, more preferably $7 \times 10^{-4}$ or less, more preferably $6.8 \times 10^{-4}$ or less and even more preferably $6 \times 10^{-4}$ or less. Note that the lower limit thereof is not particularly limited and may be 0. In view of a balanced taste and flavor, the lower limit thereof is preferably $0.01 \times 10^{-4}$, more preferably $0.05 \times 10^{-4}$ and even more preferably $0.1 \times 10^{-4}$. Furthermore, in the roasted coffee beans of the present invention, the content of chlorogenic acids per 100 g of the roasted coffee beans is 1.5 g or more, more preferably 1.8 g or more, more preferably 2 g or more, more preferably 3.8 g or more, more preferably 3.9 g or more and even more preferably 4 g or more. Note that the upper limit thereof is preferably 7 g, more preferably 6.5 g and even more preferably 6 g.

In the present invention, of the roasted coffee beans obtained by the above production method, the roasted coffee beans having the aforementioned properties may be selected by subjecting the roasted coffee beans to analysis method described later.

As suitable roasted coffee beans of the present invention, the following roasted coffee beans may be preferably mentioned.

[First Roasted Coffee Beans]

The first roasted coffee beans of the present invention usually have an L value of from 25 to 38. In view of further suppressing unpleasant taste, the upper limit thereof is preferably 35, more preferably 33 and even more preferably 31; whereas the lower limit thereof is preferably 26 and more preferably 28. The range of the L value of the first roasted coffee beans is preferably from 26 to 38, more preferably from 26 to 35, more preferably from 26 to 33, more preferably from 28 to 33 and even more preferably from 28 to 31.

In the first roasted coffee beans of the present invention, the content of (A) hydroquinone per kg of the roasted coffee beans is usually 7.1 mg or more. In view of further suppressing unpleasant taste, the content is preferably 8 mg or more, more preferably 9 mg or more and even more preferably 10 mg or more. Note that the upper limit thereof is preferably 30 mg and more preferably 28 mg in view of a balanced taste and flavor. The range of the content of (A) hydroquinone per kg of the first roasted coffee beans is preferably from 7.1 to 30 mg, more preferably from 8 to 30 mg, more preferably from 9 to 30 mg, more preferably from 9 to 28 mg and even more preferably from 10 to 28 mg.

Furthermore, the content of (B) hydroxyhydroquinone per kg of the first roasted coffee beans is usually 38 mg or less. In view of further suppressing unpleasant taste, the content is preferably 35 mg or less, more preferably 30 mg or less and even more preferably 25 mg or less. Note that the lower limit thereof is not particularly limited and may be 0. In view of a balanced taste and flavor, the lower limit thereof is preferably 0.1 mg, more preferably 0.5 mg and even more preferably 1 mg. The range of the content of (B) hydroxyhydroquinone per kg of the first roasted coffee beans is preferably from 0.1 to 38 mg, more preferably from 0.1 to 35 mg, more preferably from 0.5 to 35 mg, more preferably from 0.5 to 30 mg, more preferably from 0.5 to 25 mg and even more preferably from 1 to 25 mg.

Furthermore, in the first roasted coffee beans of the present invention, the mass ratio of (A) hydroquinone and (B) hydroxyhydroquinone, [(B)/(A)], is preferably 5 or less. In view of further suppressing unpleasant taste, the mass ratio is more preferably 4 or less, more preferably 3 or less and even more preferably 2 or less. Note that the lower limit thereof is not particularly limited and may be 0. In view of a balanced taste and flavor, the lower limit thereof is preferably 0.01, more preferably 0.05 and even more preferably 0.1. The range of the mass ratio [(B)/(A)] in the first roasted coffee beans is preferably from 0 to 5, more preferably from 0.01 to 4, more preferably from 0.01 to 3, more preferably from 0.05 to 3, more preferably from 0.05 to 2 and even more preferably from 0.1 to 2.

Furthermore, in the first roasted coffee beans of the present invention, the mass ratio of (B) hydroxyhydroquinone and (C) chlorogenic acids, [(B)/(C)], is preferably $8 \times 10^{-4}$ or less. In view of further suppressing unpleasant taste, the mass ratio is more preferably $7 \times 10^{-4}$ or less, more preferably $6.8 \times 10^{-4}$ or less and even more preferably $6 \times 10^{-4}$ or less. Note that the lower limit thereof is not particularly limited and may be 0. In view of a balanced taste and flavor, the lower limit thereof is preferably $0.01 \times 10^{-4}$, more preferably $0.05 \times 10^{-4}$ and even more preferably $0.1 \times 10^{-4}$. The range of the mass ratio [(B)/(C)] of the first roasted coffee beans is preferably from 0 to $8 \times 10^{-4}$, more preferably from $0.01 \times 10^{-4}$ to $8 \times 10^{-4}$, more preferably from $0.05 \times 10^{-4}$ to $6.8 \times 10^{-4}$, more preferably from $0.05 \times 10^{-4}$ to $6 \times 10^{-4}$ and even more preferably from $0.1 \times 10^{-4}$ to $6 \times 10^{-4}$.

Furthermore, in the first roasted coffee beans of the present invention, in view of enhancing physiological effect and suppressing unpleasant taste, the content of (C) chlorogenic acids per 100 g of the roasted coffee beans is preferably 3.8 g or more, more preferably 3.9 g or more and more preferably 4 g or more. Note that the upper limit thereof is preferably 7 g and more preferably 6.5 g. The range of the content of (C) chlorogenic acids per 100 g of the first roasted coffee beans is preferably from 3.8 to 7 g, more preferably from 3.9 to 7 g, more preferably from 3.9 to 6.5 g and even more preferably from 4 to 6.5 g. Herein, the "chlorogenic acids" in the specification is a general term of collectively encompassing a ($C^1$) monocaffeoylquinic acid such as 3-caffeoylquinic acid, 4-caffeoylquinic acid and 5-caffeoylquinic acid; a ($C^2$) monoferuloylquinic acid such as 3-feruloylquinic acid, 4-feruloylquinic acid and 5-feruloylquinic acid; and a ($C^3$) dicaffeoylquinic acid such as 3,4-dicaffeoylquinic acid, 3,5-dicaffeoylquinic acid and 4,5-dicaffeoylquinic acid. The amount of chlorogenic acids is defined as the total amount of the above 9 kinds.

[Second Roasted Coffee Beans]

The second roasted coffee beans of the present invention usually have an L value of more than 20 and less than 25. In view of further suppressing unpleasant taste and enhancing rich taste, the upper limit thereof is preferably 24, more preferably 23.5 and even more preferably 23; the lower limit thereof is preferably 20.1, more preferably 20.2, more preferably 20.3 and even more preferably 20.5. The range of the L value of the second roasted coffee beans is preferably 20.1 to less than 25, more preferably from 20.1 to 24, more preferably from 20.2 to 24, more preferably from 20.2 to 23.5, more preferably from 20.3 to 23.5, more preferably from 20.5 to 23.5 and even more preferably from 20.5 to 23.

In the second roasted coffee beans of the present invention, the content of (A) hydroquinone per kg of the roasted coffee beans is usually 10 mg or more. In view of further suppressing unpleasant taste and enhancing rich taste, the content is preferably 15 mg or more, more preferably 18 mg or more, more preferably 20 mg or more and even more preferably 22 mg or more. Note that the upper limit thereof is preferably 50 mg and more preferably 45 mg in view of a balanced taste and flavor. The range of the content of (A) hydroquinone per kg of the second roasted coffee beans is preferably from 10 to 50 mg, more preferably from 15 to 50 mg, more preferably from 18 to 50 mg, more preferably from 20 to 50 mg, more preferably from 20 to 45 mg and even more preferably from 22 to 45 mg.

Furthermore, the content of (B) hydroxyhydroquinone per kg of the second roasted coffee beans is usually 50 mg or less. In view of further suppressing unpleasant taste and enhancing rich taste, the content is preferably 40 mg or less, more preferably 35 mg or less, more preferably 30 mg or less and even more preferably 25 mg or less. Note that the lower limit thereof may be 0. In view of a balanced taste and flavor, the lower limit thereof is preferably 0.1 mg and more preferably 0.5 mg and even more preferably 1 mg. The range of the content of (B) hydroxyhydroquinone per kg of the second roasted coffee beans is preferably from 0.1 to 50 mg, more preferably from 0.1 to 40 mg, more preferably from 0.5 to 35 mg, more preferably from 0.5 to 30 mg, more preferably from 0.5 to 25 mg and even more preferably from 1 to 25 mg.

Furthermore, in the second roasted coffee beans of the present invention, the mass ratio (A) hydroquinone and (B) hydroxyhydroquinone, [(B)/(A)], is preferably 2.7 or less. In view of further suppressing unpleasant taste and enhancing rich taste, the mass ratio is more preferably 2 or less, more preferably 1.4 or less and even more preferably 1 or less. Note that the lower limit thereof is not particularly limited and may be 0. In view of a balanced taste and flavor, the lower limit thereof is preferably 0.01, more preferably 0.05 and even more preferably 0.1. The range of the mass ratio [(B)/(A)] of the second roasted coffee beans is preferably from 0 to 2.7, more preferably from 0.01 to 2.7, more preferably from 0.01 to 2, more preferably from 0.05 to 2, more preferably from 0.05 to 1.4, more preferably from 0.05 to 1 and even more preferably from 0.1 to 1.

Furthermore, in the second roasted coffee beans of the present invention, the mass ratio of (B) hydroxyhydroquinone and (C) chlorogenic acids, [(B)/(C)], is preferably $20 \times 10^{-4}$ or less. In view of further suppressing unpleasant taste, the mass ratio is more preferably $14 \times 10^{-4}$ or less, more preferably $12 \times 10^{-4}$ or less and even more preferably $8.5 \times 10^{-4}$ or less. Note that the lower limit thereof is not particularly limited and may be 0. In view of a balanced taste and flavor, the lower limit thereof is preferably $0.01 \times 10^{-4}$, more preferably $0.05 \times 10^{-4}$ and even more preferably $0.1 \times 10^{-4}$. The range of the mass ratio, [(3)/(C)] of the second roasted coffee beans is preferably from 0 to $20 \times 10^{-4}$, more preferably from $0.01 \times 10^{-4}$ to $20 \times 10^{-4}$, more preferably from $0.05 \times 10^{-4}$ to $20 \times 10^{-4}$, more preferably from $0.05 \times 10^{-4}$ to $14 \times 10^{-4}$, more preferably from $0.05 \times 10^{-4}$ to $12 \times 10^{-4}$, more preferably from $0.05 \times 10^{-4}$ to $8.5 \times 10^{-4}$ and even more preferably from $0.1 \times 10^{-4}$ to $8.5 \times 10^{-4}$.

Furthermore, in the second roasted coffee beans of the present invention, in view of enhancing a physiological effect, the content of (C) chlorogenic acids per 100 g of the roasted coffee beans is preferably 1.5 g or more, more preferably 1.8 g or more and even more preferably 2 g or more. Note that the upper limit thereof is preferably 7 g, more preferably 6.5 g and even more preferably 6 g. The range of the content of (C) chlorogenic acids per 100 g of the second roasted coffee beans is preferably from 1.5 to 7 g, more preferably from 1.8 to 7 g, more preferably from 1.8 to 6.5 g, more preferably from 1.8 to 6 g and even more preferably from 2 to 6 g.

Note that "the content of hydroquinone in roasted coffee beans", "the content of hydroxyhydroquinone in roasted coffee beans" and "the content of chlorogenic acids in roasted coffee beans" in the specification are calculated in accordance with the following formulas (1) to (3) based on the content of hydroquinone, the content of hydroxyhydroquinone and the content of chlorogenic acids in a coffee extract solution obtained from the roasted coffee beans.

The content of hydroquinone in roasted coffee beans (mg/kg)=[the content (mg/kg) of hydroquinone in coffee extract solution]×[mass of coffee extract solution (kg)]/[mass of roasted coffee beans (kg)] (1)

The content of hydroxyhydroquinone in roasted coffee beans (mg/kg)=[the content (mg/kg)of hydroxyhydroquinone in coffee extract solution]×[mass of coffee extract solution (kg)]/[mass of roasted coffee beans (kg)] (2)

The content of chlorogenic acids in roasted coffee beans (g/100 g)={[the content (g/g) of chlorogenic acids in coffee extract solution]×[mass of coffee extract solution (g)]/[mass of roasted coffee beans (g)]}×100 (3)

Note that the analysis conditions of a coffee extract solution are as follows. First, roasted coffee beans are ground. Then, the ground roasted coffee beans which pass through a 12-mesh Tyler standard sieve and do not pass through Tyler standard sieve 115 meshes are collected.

Subsequently, to the ground roasted coffee beans (0.5 g), 80 g of extraction water (a solution of 1 g of phosphoric acid and 0.03 g of 1-hydroxyethane-1,1-diphosphonic acid (HEDPO) in 1 of ion-exchanged water) was added, and the extraction is performed by immersing for 10 minutes while maintaining the temperature at 95° C. or more. Then, the supernatant of the coffee extract solution is collected, and subjected to the method described in Examples described later to analyze the content of hydroquinone, the content of hydroxyhydroquinone and the content of chlorogenic acids.

A suitable embodiment of the present invention is as follows.

[1-1] A process for producing roasted coffee beans, comprising placing starting material roasted coffee beans having an L value of from 21 to 50 in an airtight container, and subjecting the roasted coffee beans to a heat treatment at from 100 to 160° C.

[1-2] The process for producing roasted coffee beans according to [1-1] mentioned above, in which the L value of the starting material roasted coffee beans is preferably from 22 to 50, more preferably from 25 to 50, more preferably from 30 to 50, more preferably from 30 to 48, more preferably from 31 to 48, more preferably from 31 to 46 and even more preferably from 33 to 46.

[1-3] The process for producing roasted coffee beans according to [1-1] or [1-2] mentioned above, in which the heating temperature is preferably from 110 to 155° C., more preferably from 115 to 150° C., more preferably from 120 to 150° C., more preferably 120 to 145° C. and even more preferably from 120 to 140° C.

[1-4] The process for producing roasted coffee beans according to any one of [1-1] to [1-3] mentioned above, in which the time for the heat treatment is preferably from 0.5 to 4 hours, more preferably from 1 to 3 hours and even more preferably from 1 to 2 hours.

[1-5] The process for producing roasted coffee beans according to any one of [1-1] to [1-4] mentioned above, in which an internal volume of the airtight container is from 2 to 30 times and preferably from 3 to 20 times as large as the a bulk volume of the starting material roasted coffee beans.

[1-6] The process for producing roasted coffee beans according to any one of [1-1] to [1-4] mentioned above, in which when the starting material roasted coffee beans having an L value of from 30 to 50, preferably from 31 to 48, more preferably from 31 to 46 and even more preferably from 33 to 46 are used, the internal volume of the airtight container is usually from 2 to 30 times, preferably from 3 to 20 times and more preferably from 4 to 10 times as large as the bulk volume of the starting material roasted coffee beans.

[1-7] The process for producing roasted coffee beans according to any one of [1-1] to [1-4] mentioned above, in which when the starting material roasted coffee beans having an L value of 21 or more and less than 30, preferably from 21 to 29, more preferably from 21 to 28.5, more preferably from 21 to 28 and even more preferably from 22 to 28 are used, the internal volume of the airtight container is usually from 2 to 30 times, preferably from 4 to 25 times, more preferably from 5 to 20 times and preferably more than 10 times to 20 times or less as large as the bulk volume of the starting material roasted coffee beans.

[1-8] The process for producing roasted coffee beans according to any one of [1-1] to [1-7] mentioned above, in which the starting material roasted coffee beans have sizes which pass through a 12-mesh Tyler standard sieve and do not pass through a 115-mesh Tyler standard sieve.

[1-9] The process for producing roasted coffee beans according to any one of [1-1] to [1-8] mentioned above, in which as the starting material roasted coffee beans, roasted coffee beans having an L value larger by from 5 to 10 than a desired L value are used.

[1-10] The process for producing roasted coffee beans according to any one of [1-1] to [1-9] mentioned above, in which the L value of the roasted coffee beans to be produced is usually more than 20 to 38 or less, preferably from 20.1 to 38, more preferably from 20.1 to 35, more preferably from 20.2 to 35, more preferably from 20.5 to 35, more preferably from 26 to 35, more preferably from 26 to 33, more preferably from 28 to 33 and even more preferably from 28 to 31.

[1-11] The process for producing roasted coffee beans according to [1-6] mentioned above, in which the L value of the roasted coffee beans to be produced is preferably from 25 to 38, more preferably from 26 to 38, more preferably from 26 to 35, more preferably from 26 to 33, more preferably from 28 to 33 and even more preferably from 28 to 31.

[1-12] The process for producing roasted coffee beans according to [1-7] mentioned above, in which the L value of the produced roasted coffee beans is preferably more than 20 and less than 25, more preferably 20.1 to less than 25, more preferably from 20.1 to 24, more preferably from 20.2 to 24, more preferably from 20.2 to 23.5, more preferably from 20.3 to 23.5, more preferably from 20.5 to 23.5 and even more preferably from 20.5 to 23.

[1-13] The process for producing roasted coffee beans according to any one of [1-1] to [1-12] mentioned above, in which the heat treatment is carried out preferably under a normal pressure or an elevated pressure, more preferably under an elevated pressure.

[2-1] Roasted coffee beans having an L value of more than 20 and 38 or less, the content of (A) hydroquinone per kg of the roasted coffee beans of 7.1 mg or more, and the content of (B) hydroxyhydroquinone per kg of the roasted coffee beans of 50 mg or less.

[2-2] The roasted coffee beans according to [2-1] mentioned above, in which the L value is preferably from 20.1 to 38, more preferably from 20.2 to 38, more preferably from 20.5 to 38, more preferably from 25 to 38, more preferably from 26 to 35, more preferably from 26 to 33, more preferably from 28 to 33 and even more preferably from 28 to 31.

[2-3] The roasted coffee beans according to [2-1] or [2-2] mentioned above, in which the content of (A) hydroquinone per kg of the roasted coffee beans is preferably 8 mg or more, more preferably 9 mg or more and more preferably 10 mg or more.

[2-4] The roasted coffee beans according to any one of [2-1] to [2-3] mentioned above, in which the upper limit of the content of (A) hydroquinone per kg of the roasted coffee beans is preferably 45 mg, more preferably 30 mg and even more preferably 28 mg.

[2-5] The roasted coffee beans according to any one of [2-1] to [2-4] mentioned above, in which the content of (B) hydroxyhydroquinone per kg of the roasted coffee beans is preferably 40 mg or less, more preferably 38 mg or less, more preferably 35 mg or less, more preferably 30 mg or less and even more preferably 25 mg or less.

[2-6] The roasted coffee beans according to any one of [2-1] to [2-5] mentioned above, in which the lower limit of the content of (B) hydroxyhydroquinone per kg of the roasted coffee beans is preferably 0.1 mg, more preferably 0.5 mg and even more preferably 1 mg.

[2-7] The roasted coffee beans according to any one of [2-1] to [2-6] mentioned above, in which the mass ratio of (A) hydroquinone and (B) hydroxyhydroquinone, [(B)/(A)], is preferably 5 or less, more preferably 4 or less, more preferably 3 or less and even more preferably 2 or less.

[2-8] The roasted coffee beans according to any one of [2-1] to [2-7] mentioned above, in which the lower limit of the mass ratio of (A) hydroquinone and (B) hydroxyhydroquinone, [(B)/(A)], is preferably 0.01, more preferably 0.05 and even more preferably 0.1.

[2-9] The roasted coffee beans according to any one of [2-1] to [2-8] mentioned above, in which the mass ratio of (B) hydroxyhydroquinone and (C) chlorogenic acids, [(B)/(C)], is preferably $20\times10^{-4}$ or less, more preferably $14\times10^{-4}$ or less, more preferably $12\times10^{-4}$ or less, more preferably $8.5\times10^{-4}$ or less, more preferably $8\times10^{-4}$ or less, more preferably $7\times10^{-4}$ or less, more preferably $6.8\times10^{-4}$ or less and even more preferably $6\times10^{-4}$ or less.

[2-10] The roasted coffee beans according to any one of [2-1] to [2-9] mentioned above, in which the lower limit of the mass ratio of (B) hydroxyhydroquinone and (C) chlorogenic acids, [(B)/(C)], is preferably $0.01\times10^{-4}$, more preferably $0.05\times10^{-4}$ and even more preferably $0.1\times10^{-4}$.

[2-11] The roasted coffee beans according to any one of [2-1] to [2-10] mentioned above, in which the content of chlorogenic acids per 100 g of the roasted coffee beans is preferably 1.5 g or more, more preferably 1.8 g or more, more preferably 2 g or more, more preferably 3.8 g or more, more preferably 3.9 g or more, and even more preferably 4 g or more.

[2-12] The roasted coffee beans according to any one of [2-1] to [2-11] mentioned above, in which the upper limit of the content of chlorogenic acids per 100 g of the roasted coffee beans is preferably 7 g, more preferably 6.5 g, and even more preferably 6 g.

[3-1] Roasted coffee beans having an L value of 25 to 38, the content of (A) hydroquinone per kg of the roasted coffee beans of 7.1 mg or more, and the content of (B) hydroxyhydroquinone per kg of the roasted coffee beans of 38 mg or less.

[3-2] The roasted coffee beans according to [3-1] mentioned above, in which the L value is preferably from 26 to 38, more preferably from 26 to 35, more preferably from 26 to 33, more preferably from 28 to 33 and even more preferably 28 to 31.

[3-3] The roasted coffee beans according to [3-1] or [3-2] mentioned above, in which the content of (A) hydroquinone per kg of the roasted coffee beans is preferably 8 mg or more, more preferably 9 mg or more and even more preferably 10 mg or more.

[3-4] The roasted coffee beans according to [3-1] or [3-2] mentioned above, in which the content of (A) hydroquinone per kg of the roasted coffee beans is preferably 7.1 to 30 mg, more preferably 8 to 30 mg, more preferably 9 to 30 mg, more preferably 9 to 28 mg and even more preferably 10 to 28 mg.

[3-5] The roasted coffee beans according to any one of [3-1] to [3-4] mentioned above, in which the content of (B) hydroxyhydroquinone per kg of the roasted coffee beans is preferably 35 mg or less, more preferably 30 mg or less and even more preferably 25 mg or less.

[3-6] The roasted coffee beans according to any one of [3-1] to [3-4] mentioned above, in which the content of (B) hydroxyhydroquinone per kg of the roasted coffee beans is preferably from 0.1 to 38 mg, more preferably from 0.1 to 35 mg, more preferably from 0.5 to 35 mg, more preferably from 0.5 to 30 mg, more preferably from 0.5 to 25 mg and even more preferably from 1 to 25 mg.

[3-7] The roasted coffee beans according to any one of [3-1] to [3-6] mentioned above, in which the mass ratio of (A) hydroquinone and (B) hydroxyhydroquinone, [(B)/(A)], is preferably 5 or less, more preferably 4 or less, more preferably 3 or less and even more preferably 2 or less.

[3-8] The roasted coffee beans according to any one of [3-1] to [3-6] mentioned above, in which the mass ratio of (A) hydroquinone and (B) hydroxyhydroquinone, [(B)/(A)], is preferably from 0 to 5, more preferably from 0.01 to 4, more preferably from 0.01 to 3, more preferably from 0.05 to 3, more preferably from 0.05 to 2 and even more preferably from 0.1 to 2.

[3-9] The roasted coffee beans according to any one of [3-1] to [3-8] mentioned above, in which the mass ratio of (B) hydroxyhydroquinone and (C) chlorogenic acids, [(B)/(C)], is preferably $8\times10^{-4}$ or less, more preferably $7\times10^{-4}$ or less, more preferably $6.8\times10^{-4}$ or less and even more preferably $6\times10^{-4}$ or less.

[3-10] The roasted coffee beans according to any one of [3-1] to [3-8] mentioned above, in which the mass ratio of (B) hydroxyhydroquinone and (C) chlorogenic acids, [(B)/(C)], is preferably from 0 to $8\times10^{-4}$, more preferably from $0.01\times10^{-4}$ to $8\times10^{-4}$, more preferably from $0.05\times10^{-4}$ to $6.8\times10^{-4}$, more preferably from $0.05\times10^{-4}$ to $6\times10^{-4}$, and even more preferably from $0.1\times10^{-4}$ to $6\times10^{-4}$.

[3-11] The roasted coffee beans according to any one of [3-1] to [3-10] mentioned above, in which the content of (C) chlorogenic acids per 100 g of the roasted coffee beans is preferably 3.8 g or more, more preferably 3.9 g or more and even more preferably 4 g or more.

[3-12] The roasted coffee beans according to any one of [3-1] to [3-10] mentioned above, in which the content of (C) chlorogenic acids per 100 g of the roasted coffee beans is preferably from 3.8 to 7 g, more preferably from 3.9 to 7 g, more preferably from 3.9 to 6.5 g and even more preferably from 4 to 6.5 g.

[4-1] Roasted coffee beans having an L value of more than 20 and less than 25, the content of (A) hydroquinone per kg of the roasted coffee beans of 10 mg or more, and the content of (B) hydroxyhydroquinone per kg of the roasted coffee beans of 50 mg or less.

[4-2] The roasted coffee beans according to [4-1] mentioned above, in which the L value is preferably 20.1 to less than 25, more preferably from 20.1 to 24, more preferably from 20.2 to 24, more preferably from 20.2 to 23.5, more preferably from 20.3 to 23.5, more preferably from 20.5 to 23.5 and even more preferably from 20.5 to 23.

[4-3] The roasted coffee beans according to [4-1] or [4-2] mentioned above, in which the content of (A) hydroquinone per kg of the roasted coffee beans is preferably 15 mg or more, more preferably 18 mg or more, more preferably 20 mg or more and even more preferably 22 mg or more.

[4-4] The roasted coffee beans according to [4-1] or [4-2] mentioned above, in which the content of (A) hydroquinone per kg of the roasted coffee beans is preferably from 10 to 50 mg, more preferably from 15 to 50 mg, more preferably from 18 to 50 mg, more preferably from 20 to 50 mg, more preferably from 20 to 45 mg and even more preferably from 22 to 45 mg.

[4-5] The roasted coffee beans according to any one of [4-1] to [4-4] mentioned above, in which the content of (B) hydroxyhydroquinone per kg of the roasted coffee beans is preferably 40 mg or less, more preferably 35 mg or less, more preferably 30 mg or less and even more preferably 25 mg or less.

[4-6] The roasted coffee beans according to any one of [4-1] to [4-4] mentioned above, in which the content of (B) hydroxyhydroquinone per kg of the roasted coffee beans is preferably from 0.1 to 50 mg, more preferably from 0.1 to 40 mg, more preferably from 0.5 to 35 mg, more preferably from 0.5 to 30 mg, more preferably from 0.5 to 25 mg and even more preferably from 1 to 25 mg.

[4-7] The roasted coffee beans according to any one of [4-1] to [4-6] mentioned above, in which the mass ratio of (A) hydroquinone and (B) hydroxyhydroquinone, [(B)/(A)], is preferably 2.7 or less, more preferably 2 or less, more preferably 1.4 or less and even more preferably 1 or less.

[4-8] The roasted coffee beans according to any one of [4-1] to [4-6] mentioned above, in which the mass ratio of (A) hydroquinone and (B) hydroxyhydroquinone, [(B)/(A)], is preferably from 0 to 2.7, more preferably from 0.01 to 2.7, more preferably from 0.01 to 2, more preferably from 0.05 to 2, more preferably from 0.05 to 1.4, more preferably from 0.05 to 1 and even more preferably from 0.1 to 1.

[4-9] The roasted coffee beans according to any one of [4-1] to [4-8] mentioned above, in which the mass ratio of (B) hydroxyhydroquinone and (C) chlorogenic acids, [(B)/(C)], is preferably $20 \times 10^{-4}$ or less, more preferably $14 \times 10^{-4}$ or less, more preferably $12 \times 10^{-4}$ or less and even more preferably $8.5 \times 10^{-4}$ or less.

[4-10] The roasted coffee beans according to any one of [4-1] to [4-8] mentioned above, in which the mass ratio of (B) hydroxyhydroquinone and (C) chlorogenic acids, [(B)/(C)], is preferably from 0 to $20 \times 10^{-4}$, more preferably from $0.01 \times 10^{-4}$ to $20 \times 10^{-4}$, more preferably from $0.05 \times 10^{-4}$ to $20 \times 10^{-4}$, more preferably from $0.05 \times 10^{-4}$ to $14 \times 10^{-4}$, more preferably from $0.05 \times 10^{-4}$ to $12 \times 10^{-4}$, more preferably from $0.05 \times 10^{-4}$ to $8.5 \times 10^{-4}$ and even more preferably from $0.1 \times 10^{-4}$ to $8.5 \times 10^{-4}$.

[4-11] The roasted coffee beans according to any one of [4-1] to [4-10] mentioned above, in which the content of (C) chlorogenic acids per 100 g of the roasted coffee beans is preferably 1.5 g or more, more preferably 1.8 g or more and even more preferably 2 g or more.

[4-12] The roasted coffee beans according to any one of [4-1] to [4-10] mentioned above, in which the content of (C) chlorogenic acids per 100 g of the roasted coffee beans is preferably from 1.5 to 7 g, more preferably from 1.8 to 7 g, more preferably from 1.8 to 6.5 g, more preferably from 1.8 to 6 g and even more preferably from 2 to 6 g.

EXAMPLE

1. Analysis of Chlorogenic Acids (CGA)

HPLC was used as an analyzer. The model numbers of component units in the analyzer are as follows:

UV-VIS detector: L-2420 (Hitachi High-Technologies Corporation),
Column oven: L-2300 (Hitachi High-Technologies Corporation),
Pump: L-2130 (Hitachi High-Technologies Corporation),
Autosampler: L-2200 (Hitachi High-Technologies Corporation), Column: Cadenza CD-C18, 4.6 mm (inner diameter)×150 mm (length), particle size 3 μm (Imtakt Corp.)

Analysis conditions are as follows:
Sample injection volume: 10 μL,
Flow rate: 1.0 mL/min,
Predetermined wavelength of UV-VIS detector: 325 nm,
Predetermined temperature of column oven: 35° C.,
Eluent A: 5 (V/V) % acetonitrile solution containing 0.05 M acetic acid, 0.1 mM HEDPO and 10 mM sodium acetate,
Eluent B: acetonitrile.

Concentration Gradient Conditions

| Time | Eluent A | Eluent B |
|---|---|---|
| 0.0 min. | 100% | 0% |
| 10.0 min. | 100% | 0% |
| 15.0 min. | 95% | 5% |
| 20.0 min. | 95% | 5% |
| 22.0 min. | 92% | 8% |
| 50.0 min. | 92% | 8% |
| 52.0 min. | 10% | 90% |
| 60.0 min. | 10% | 90% |
| 60.1 min. | 100% | 0% |
| 70.0 min. | 100% | 0% |

In HPLC, a coffee extract solution was filtrated by a membrane filter (GL chromatodisk 25A, pore size 0.45 μm, GL Sciences Inc.) and then subjected to analysis.

Retention time of chlorogenic acids (unit: minute)
($C^1$) monocaffeoylquinic acid: 3 peaks at 5.3, 8.8, 11.6
($C^2$) monoferuloylquinic acid: 3 peaks at 13.0, 19.9, 21.0
($C^3$) dicaffeoylquinic acid: 3 peaks at 36.6, 37.4, 44.2.

From area values of the nine chlorogenic acids as obtained herein, the content of chlorogenic acids (g/100 g) was determined by using 5-caffeoylquinic acid used as a standard substance.

2. Method for Analyzing Hydroquinone and Hydroxyhydroquinone by an HPLC-Electrochemical Detector As an analyzer, a coularray system (model 5600A, manufactured by ESA in the U.S.), which is an HPLC-electrochemical detector (coulometric type) was used. The names and model numbers of the component units of the system are as follows:

Analytical cell: Model 5010, coularray organizer,
Coularray electronics module.software: Model 5600A,
Solvent feeder module: Model 582, gradient mixer,
Autosampler: Model 542, pulse damper,
Degasser: Degasys Ultimate DU3003,
Column oven: 505,
Column: CAPCELL PAK C18 AQ, 4.6 mm (inner diameter)×250 mm (length), particle size: 5 μm (Shiseido Co., Ltd.).

Analysis conditions are as follows:
Sample injection volume: 10 μL,
Flow rate: 1.0 mL/min,
Voltage application of electrochemical detector: 200 mV,
Predetermined temperature of column oven: 40° C.,
Eluent C: 5 (V/V) % methanol solution containing 0.1 (W/V) % phosphoric acid and 0.1 mM 1-hydroxyethane-1,1-diphosphonic acid,
Eluent D: 50 (V/V) % methanol solution containing 0.1 (W/V) % phosphoric acid and 0.1 mM 1-hydroxyethane-1,1-diphosphonic acid.

For preparing Eluents C and D, distilled water for high-performance liquid chromatography (Kanto Chemical Co., Inc.), methanol for high-performance liquid chromatography (Kanto Chemical Co., Inc.), phosphoric acid (guaranteed reagent, Wako Pure Chemical Industries, Ltd.), 1-hydroxyethane-1,1-diphosphonic acid (60% aqueous solution, Tokyo Kasei Kogyo Co., Ltd.) were used.

Concentration Gradient Conditions

| Time | Eluent C | Eluent D |
|---|---|---|
| 0.0 min. | 100% | 0% |
| 10.0 min. | 100% | 0% |
| 10.1 min. | 0% | 100% |
| 20.0 min. | 0% | 100% |
| 20.1 min. | 100% | 0% |
| 50.0 min. | 100% | 0% |

A coffee extract solution was allowed to pass through Bond Elut SCX (packed weight of solid phase charge: 500 mg, reservoir capacity: 3 mL, GL Sciences Inc.). The initial passed solution (volume: approximately 0.5 mL) was discarded, and other passed solution was obtained. Immediately upon filtrating the fractions by a membrane filter (GL chromatodisk 25A, pore size: 0.45 μm, GL Sciences Inc.), the filtrate was subjected to analysis.

In the analysis performed by the HPLC-electrochemical detector in the aforementioned conditions, the retention time of hydroxyhydroquinone was 6.38 minutes, whereas the retention time of hydroquinone was 9.2 minutes.

From the peak area values obtained, the content of hydroquinone (mg/kg) and the content of hydroxyhydroquinone (mg/kg) were determined with reference to hydroquinone (Wako Pure Chemical Industries, Ltd.) and hydroxyhydroquinone (Wako Pure Chemical Industries, Ltd.) as standard substances.

3. Measurement of L Value

A sample was measured by a color difference meter (spectrophotometer SE2000 manufactured by Nippon Denshoku Industries Co., Ltd.).

4. Sensory Evaluation

Coffee extract solution obtained in each of Examples and Comparative Examples was evaluated for unpleasant taste by five expert panels in accordance with the following criteria. After that, discussion was made to determine the final score.

Evaluation criteria of unpleasant taste
5: No unpleasant taste is sensed
4: Unpleasant taste is slightly sensed
3: Unpleasant taste is rather sensed
2: Unpleasant taste is sensed
1: Unpleasant taste is strongly sensed

[First Roasted Coffee Beans]

Example 1

Starting material roasted coffee beans having an L value of 34.8 were ground by a grinder (Wonder Blender WB-1, Osaka Chemical Co., Ltd., hereinafter the same). The ground coffee beans, which passed through a 12-mesh Tyler standard sieve and did not pass through a 115-mesh Tyler standard sieve, were collected. The ground coffee beans thus obtained (20 g (bulk volume: 41 cm$^3$)) were placed in an SOT can (stay-on-tab can) having an internal volume of 190 cm$^3$ and the opening portion was sealed. After that, the SOT can was charged into an autoclave (HI Clave, HVA-85, Hirayama Manufacturing Corporation, hereinafter the same) and a heat treatment was performed at 125° C. for one hour under pressure of 0.145 MPa in terms of gauge pressure to obtain the roasted coffee beans having an L value of 28.4.

Subsequently, to the roasted coffee beans thus-obtained (0.5 g), 80 g of extraction water (a solution of 1 g of phosphoric acid and 0.03 g of 1-hydroxyethane-1,1-diphosphonic acid (HEDPO) in 1 of ion-exchanged water) was added, and the extraction was performed by immersing for 10 minutes while maintaining the temperature at 95° C. or more. The supernatant was collected to obtain a coffee extract solution (1). The obtained coffee extract solution (1) was subjected to componential analysis. The results are shown in Table 1.

Furthermore, to the roasted coffee beans (5 g), 100 g of hot water (98° C. or more) was added. The mixture was sufficiently stirred, and filtrated by a commercially available coffee filter to obtain a coffee extract solution (2). The obtained coffee extract solution (2) was subjected to a sensory test. The results are shown in Table 1.

Example 2

Roasted coffee beans having an L value of 26.0 were obtained in the same operation as in Example 1, except that the heating time of starting material roasted coffee beans was changed to 2 hours.

Componential analysis and sensory test of the obtained roasted coffee beans were performed in the same operation as in Example 1. The results are shown in Table 1.

Example 3

Starting material roasted coffee beans having an L value of 34.8 were ground by a grinder. The ground coffee beans, which passed through a 12-mesh Tyler standard sieve and did not pass through a 115-mesh Tyler standard sieve, were collected. The ground coffee beans thus obtained (20 g (bulk volume: 41 cm$^3$)) were placed in an SOT can having a volume of 190 mL and the opening portion was sealed. After that, the SOT can was charged into a dryer (DP33, Yamato Scientific Co., Ltd., hereinafter the same) and a heat treatment was performed at 125° C. for 2 hours under normal pressure to obtain the roasted coffee beans having an L value of 28.3.

Componential analysis and sensory test of the obtained roasted coffee beans were performed in the same operation as in Example 1. The results are shown in Table 1.

Example 4

Roasted coffee beans having an L value of 26.5 were obtained in the same operation as in Example 3, except that the heating temperature and heating time of the starting material roasted coffee beans were changed to 140° C. and 1 hour, respectively.

Componential analysis and sensory test of the obtained roasted coffee beans were performed in the same operation as in Example 1. The results are shown in Table 1.

Example 5

Roasted coffee beans having an L value of 25.3 were obtained in the same operation as in Example 4, except that the heating time of the starting material roasted coffee beans was changed to 2 hours.

Componential analysis and sensory test of the obtained roasted coffee beans were performed in the same operation as in Example 1. The results are shown in Table 1.

Comparative Example 1

Starting material roasted coffee beans having an L value of 34.8 were ground by a grinder. The ground coffee beans, which passed through a 12-mesh Tyler standard sieve and did not pass through a 115-mesh Tyler standard sieve, were collected.

Componential analysis and sensory test of the obtained roasted coffee beans were performed in the same operation as in Example 1. The results are shown in Table 1.

Comparative Example 2

Starting material roasted coffee beans having an L value of 34.8 were ground by a grinder. The ground coffee beans, which passed through a 12-mesh Tyler standard sieve and did not pass through a 115-mesh Tyler standard sieve, were collected, and they were charged into a dryer. A heat treatment was performed at 125° C. for 2 hours under normal pressure to obtain the roasted coffee beans having an L value of 32.9.

Componential analysis and sensory test of the obtained roasted coffee beans were performed in the same operation as in Example 1. The results are shown in Table 1.

Comparative Example 3

Roasted coffee beans having an L value of 31.6 were obtained in the same operation as in Comparative Example 2, except that the heating temperature and heating time of the starting material roasted coffee beans were changed to 140° C. and 1 hour, respectively.

Componential analysis and sensory test of the obtained roasted coffee beans were performed in the same operation as in Example 1. The results are shown in Table 1.

Comparative Example 4

Roasted coffee beans having an L value of 27.9 were obtained in the same operation as in Comparative Example 3, except that the heating time of the starting material roasted coffee beans was changed to 2 hours.

Componential analysis and sensory test of the obtained roasted coffee beans were performed in the same operation as in Example 1. The results are shown in Table 1.

Example 6

Roasted coffee beans having an L value of 28.2 were obtained in the same operation as in Example 1, except that starting material roasted coffee beans having an L value of 35.6 were used.

Componential analysis and sensory test of the obtained roasted coffee beans were performed in the same operation as in Example 1. The results are shown in Table 2.

Example 7

Roasted coffee beans having an L value of 25.8 were obtained in the same operation as in Example 2, except that starting material roasted coffee beans having an L value of 35.6 were used.

Componential analysis and sensory test of the obtained roasted coffee beans were performed in the same operation as in Example 1. The results are shown in Table 2.

Example 8

Roasted coffee beans having an L value of 28.9 were obtained in the same operation as in Example 3, except that starting material roasted coffee beans having an L value of 35.6 were used.

Componential analysis and sensory test of the obtained roasted coffee beans were performed in the same operation as in Example 1. The results are shown in Table 2.

Example 9

Roasted coffee beans having an L value of 30.1 were obtained in the same operation as in Example 6, except that starting material roasted coffee beans having an L value of 38.5 were used.

Componential analysis and sensory test of the obtained roasted coffee beans were performed in the same operation as in Example 1. The results are shown in Table 2.

TABLE 1

| | | Example | | | | | Comparative Example | | | |
|---|---|---|---|---|---|---|---|---|---|---|
| | | 1 | 2 | 3 | 4 | 5 | 1 | 2 | 3 | 4 |
| Production conditions | L value of starting material roasted coffee beans | 34.8 | 34.8 | 34.8 | 34.8 | 34.8 | 34.8 | 34.8 | 34.8 | 34.8 |
| | Heat treatment conditions Temperature (° C.) | 125 | 125 | 125 | 140 | 140 | — | 125 | 140 | 140 |
| | Time (hr) | 1 | 2 | 2 | 1 | 2 | — | 2 | 1 | 2 |
| | Presence or absence of airtight sealing | Present | Present | Present | Present | Present | — | Absent | Absent | Absent |
| | Ratio of internal volume of container (relative to starting material roasted coffee beans) | 4.6 | 4.6 | 4.6 | 4.6 | 4.6 | — | — | — | — |
| Roasted coffee beans after heat treatment (analysis value) | L value | 28.4 | 26.0 | 28.3 | 26.5 | 25.3 | — | 32.9 | 31.6 | 27.9 |
| | (A) Hydroquinone amount (mg/kg) | 14.8 | 21.9 | 10.7 | 16.6 | 26.3 | 3.2 | 3.9 | 4.6 | 4.2 |
| | (B) Hydroxyhydroquinone amount (mg/kg) | 22.7 | 24.5 | 17.2 | 20.7 | 27.4 | 48.8 | 43.1 | 38.7 | 37.7 |
| | (C) Chlorogenic acids amount (g/100 g) | 4.105 | 3.905 | 4.274 | 4.141 | 4.027 | 4.231 | 4.311 | 4.453 | 4.45 |
| | Mass ratio (B)/(A) | 1.53 | 1.12 | 1.61 | 1.25 | 1.04 | 15.25 | 11.05 | 8.41 | 8.98 |
| | Mass ratio [(B)/(C)]* ($\times 10^{-4}$) | 5.5 | 6.3 | 4.0 | 5.0 | 6.8 | 12.0 | 10.0 | 8.7 | 8.5 |
| Taste and flavor evaluation | Unpleasant taste | 5 | 5 | 5 | 5 | 5 | 1 | 1 | 2 | 2 |

*In the table, the mass ratio [(B)/(C)] value is calculated by multiplying a numerical value shown in a column by $10^{-4}$.

Example 10

Roasted coffee beans having an L value of 34.9 were obtained in the same operation as in Example 6, except that starting material roasted coffee beans having an L value of 45.6 were used.

Componental analysis and sensory test of the obtained roasted coffee beans were performed in the same operation as in Example 1. The results are shown in Table 2.

Example 11

Roasted coffee beans having an L value of 31.8 were obtained in the same operation as in Example 6, except that starting material roasted coffee beans having an L value of 42.4 were used.

Componental analysis and sensory test of the obtained roasted coffee beans were performed in the same operation as in Example 1. The results are shown in Table 2.

Example 12

Roasted coffee beans having an L value of 32.8 were obtained in the same operation as in Example 6, except that the heating temperature of the starting material roasted coffee beans was changed to 115° C.

Componental analysis and sensory test of the obtained roasted coffee beans were performed in the same operation as in Example 1. The results are shown in Table 2.

Comparative Example 5

Starting material roasted coffee beans having an L value of 28.3 were ground by a grinder. The ground coffee beans, which passed through a 12-mesh Tyler standard sieve and did not pass through a 115-mesh Tyler standard sieve, were collected.

Componental analysis and sensory test of the obtained roasted coffee beans were performed in the same operation as in Example 1. The results are shown in Table 2.

Comparative Example 6

Starting material roasted coffee beans having an L value of 35.6 were ground by a grinder. The ground coffee beans, which passed through a 12-mesh Tyler standard sieve and did not pass through a 115-mesh Tyler standard sieve, were collected.

Componental analysis and sensory test of the obtained roasted coffee beans were performed in the same operation as in Example 1. The results are shown in Table 2.

Comparative Example 7

Starting material roasted coffee beans having an L value of 30.8 were ground by a grinder. The ground coffee beans, which passed through a 12-mesh Tyler standard sieve and did not pass through a 115-mesh Tyler standard sieve, were collected.

Componental analysis and sensory test of the obtained roasted coffee beans were performed in the same operation as in Example 1. The results are shown in Table 2.

Comparative Example 8

Roasted coffee beans having an L value of 38.4 were obtained in the same operation as in Example 6, except that starting material roasted coffee beans having an L value of 52.2 were used.

Componental analysis and sensory test of the obtained roasted coffee beans were performed in the same operation as in Example 1. The results are shown in Table 2.

TABLE 2

| | | | Example | | | | | | | Comparative Example | | | |
| --- | --- | --- | --- | --- | --- | --- | --- | --- | --- | --- | --- | --- | --- |
| | | | 6 | 7 | 8 | 9 | 10 | 11 | 12 | 5 | 6 | 7 | 8 |
| Production conditions | L value of starting material roasted coffee beans | | 35.6 | 35.6 | 35.6 | 38.5 | 45.6 | 42.4 | 35.6 | 28.3 | 35.6 | 30.8 | 52.2 |
| | Heat treatment conditions | Temperature (° C.) | 125 | 125 | 125 | 125 | 125 | 125 | 115 | — | — | — | 125 |
| | | Time (hr) | 1 | 2 | 2 | 1 | 1 | 1 | 1 | — | — | — | 1 |
| | | Presence or absence of airtight sealing | Present | Present | Present | Present | Present | Present | Present | — | — | — | Present |
| | | Ratio of internal volume of container (relative to starting material roasted coffee beans) | 4.6 | 4.6 | 4.6 | 4.6 | 4.6 | 4.6 | 4.6 | — | — | — | — |
| Roasted coffee beans after heat treatment (analysis value) | L value | | 28.2 | 25.8 | 28.9 | 30.1 | 34.9 | 31.8 | 32.8 | — | — | — | 38.4 |
| | (A) Hydroquinone amount (mg/kg) | | 7.7 | 14.8 | 7.5 | 12.1 | 9 | 9.5 | 5.8 | 6.5 | 3.9 | 7 | 5.8 |
| | (B) Hydroxyhydroquinone amount (mg/kg) | | 16.9 | 18.8 | 16 | 12.4 | 5.5 | 9.5 | 37.4 | 94.1 | 57.8 | 100.5 | 4.3 |
| | (C) Chlorogenic acids amount (g/100 g) | | 5.297 | 5.096 | 5.321 | 4.513 | 4.881 | 6.091 | 5.323 | 3.618 | 5.353 | 4.083 | 7.185 |
| | Mass ratio (B)/(A) | | 2.19 | 1.27 | 2.13 | 1.02 | 0.61 | 1.00 | 6.50 | 14.48 | 14.82 | 14.36 | 0.74 |
| | Mass ratio [(B)/(C)]* ($\times 10^{-4}$) | | 3.2 | 3.7 | 3.0 | 2.7 | 1.1 | 1.6 | 7.0 | 26.0 | 11.0 | 25.0 | 0.6 |
| Taste and flavor evaluation | Unpleasant taste | | 4 | 5 | 4 | 5 | 5 | 5 | 3 | 1 | 1 | 1 | 2 |

*In the table, the mass ratio [(B)/(C)] value is calculated by multiplying a numerical value shown in a column by $10^{-4}$.

which passed through a 12-mesh Tyler standard sieve and did not pass through a 115-mesh Tyler standard sieve, were collected.

Componental analysis and sensory test of the obtained roasted coffee beans were performed in the same operation as in Example 1. The results are shown in Table 2.

From Tables 1 and 2, it was found that light roasted coffee beans useful as a starting material for a coffee beverage suppressed in unpleasant taste are obtained by separately controlling the L value to be from 25 to 38, the content of component (A) to be 7.1 mg/kg or more, and the content of component (B) to be 38 mg/kg or less.

[Second Roasted Coffee Beans]

In the following Examples and Comparative Example, not only unpleasant taste but also rich taste of the obtained coffee extract solutions were evaluated by five expert panels in accordance with the following criteria. After that, discussion was made to determine the final score. Note that the evaluation criteria of unpleasant taste are the same as specified above.

Evaluation criteria of rich taste
5: Rich taste is strongly sensed
4: Rich taste is sensed
3: Rich taste is slightly sensed
2: No rich taste is sensed Example 13

Starting material roasted coffee beans having an L value of 28.3 were ground by a grinder (Wonder Blender WB-1, Osaka Chemical Co., Ltd., hereinafter the same). The ground coffee beans, which passed through a 12-mesh Tyler standard sieve and did not pass through a 115-mesh Tyler standard sieve, were collected. The ground coffee beans thus obtained (20 g (bulk volume: 41 $cm^3$)) were placed in an SOT can (stay-on-tab can) having an internal volume of 190 $cm^3$ and the opening portion was sealed.

After that, the SOT can was charged into an autoclave (HI Clave, HVA-85, Hirayama Manufacturing Corporation, hereinafter the same), and a heat treatment was performed at 125° C. for one hour under pressure of 0.135 MPa in terms of absolute pressure to obtain the roasted coffee beans having an L value of 22.7.

Subsequently, to the roasted coffee beans thus-obtained (0.5 g), 80 g of extraction water (a solution of 1 g of phosphoric acid and 0.03 g of 1-hydroxyethane-1,1-diphosphonic acid (HEDPO) in 1 of ion-exchanged water) was added, and the extraction was performed by immersing for 10 minutes while maintaining the temperature at 95° C. or more. The supernatant was collected to obtain a coffee extract solution (3). The obtained coffee extract solution (3) was subjected to componential analysis.

Furthermore, to the roasted coffee beans (5 g), 100 g of hot water (98° C. or more) was added. The mixture was sufficiently stirred and filtrated by a commercially available coffee filter to obtain a coffee extract solution (4). The obtained coffee extract solution (4) was subjected to a sensory test.

These results are shown in Table 3.

Example 14

Starting material roasted coffee beans having an L value of 23.9 were ground by the grinder. The ground coffee beans, which passed through a 12-mesh Tyler standard sieve and did not pass through a 115-mesh Tyler standard sieve, were collected. The ground coffee beans thus obtained (20 g (bulk volume: 41 $cm^3$)) were placed in an SOT can having an internal volume of 190 $cm^3$ and the opening portion was sealed. After that, the SOT can was charged into the autoclave and a heat treatment was performed at 125° C. for one hour under pressure of 0.135 MPa in terms of absolute pressure to obtain the roasted coffee beans having an L value of 21.0.

The obtained roasted coffee beans were subjected to componential analysis and sensory test performed in the same operation as in Example 13. The results are shown in Table 3.

Comparative Example 9

Starting material roasted coffee beans having an L value of 28.3 were ground by a grinder. The ground coffee beans, which passed through a 12-mesh Tyler standard sieve and did not pass through a 115-mesh Tyler standard sieve, were collected.

The obtained roasted coffee beans were subjected to componential analysis and sensory test performed in the same operation as in Example 13. The results are shown in Table 3.

Comparative Example 10

Starting material roasted coffee beans having an L value of 23.9 were ground by a grinder. The ground coffee beans, which passed through a 12-mesh Tyler standard sieve and did not pass through a 115-mesh Tyler standard sieve, were collected.

The obtained roasted coffee beans were subjected to componential analysis and sensory test performed in the same operation as in Example 13. The results are shown in Table 3.

TABLE 3

| | | | Example | | Comparative Example | |
|---|---|---|---|---|---|---|
| | | | 13 | 14 | 9 | 10 |
| Production conditions | L value of starting material roasted coffee beans | | 28.3 | 23.9 | 28.3 | 23.9 |
| | Heat treatment conditions | Temperature (° C.) | 125 | 125 | — | — |
| | | Time (hr) | 1 | 1 | — | — |
| | | Presence or absence of airtight sealing | Present | Present | — | — |
| | | Ratio of internal volume of container (relative to starting material roasted coffee beans) | 4.6 | 4.6 | — | — |
| Roasted coffee beans after heat treatment (analysis value) | L value | | 22.7 | 21.0 | — | — |
| | (A) Hydroquinone content (mg/kg) | | 16.5 | 15.0 | 6.5 | 11.3 |

TABLE 3-continued

|  |  | Example | | Comparative Example | |
|---|---|---|---|---|---|
|  |  | 13 | 14 | 9 | 10 |
|  | (B) Hydroxyhydroquinone content (mg/kg) | 27.9 | 40.5 | 94.1 | 125.2 |
|  | (C) Chlorogenic acids content (g/100 g) | 3.444 | 2.779 | 3.618 | 2.787 |
|  | Mass ratio (B)/(A) | 1.69 | 2.70 | 14.48 | 11.08 |
|  | Mass ratio [(B)/(C)]* (×10⁻⁴) | 8.10 | 14.57 | 26.01 | 44.92 |
| Taste and flavor evaluation | Unpleasant taste | 5 | 4 | 1 | 1 |
|  | Rich taste | 4 | 4 | 3 | 3 |

*In the table, the mass ratio [(B)/(C)] value is calculated by multiplying a numerical value shown in a column by $10^{-4}$.

Example 15

Roasted coffee beans having an L value of 30.1 and roasted coffee beans having an L value of 17.1 were separately ground by a grinder. The ground coffee beans, which passed through a 12-mesh Tyler standard sieve and did not pass through a 115-mesh Tyler standard sieve, were separately collected. The obtained ground coffee beans having an L value of 30.1 and the obtained ground coffee beans having an L value of 17.1 were mixed in a ratio of 44 to 56 to obtain starting material roasted coffee beans having an L value of 22.8. The starting material roasted coffee beans thus obtained (5 g (bulk volume: 10.25 cm³)) were placed in an SOT can having an internal volume of 190 cm³ and the opening portion was sealed. After that, the SOT can was charged into an autoclave, and a heat treatment was performed at 125° C. for one hour under pressure of 0.135 MPa in terms of absolute pressure to obtain the roasted coffee beans having an L value of 20.1.

Componential analysis and sensory test of the obtained roasted coffee beans were performed in the same operation as in Example 13. The results are shown in Table 4.

Example 16

Roasted coffee beans having an L value of 34.8 and roasted coffee beans having an L value of 18.2 were separately ground by a grinder. The ground coffee beans, which passed through a 12-mesh Tyler standard sieve and did not pass through a 115-mesh Tyler standard sieve, were separately collected. The obtained ground coffee beans having an L value of 34.8 and the obtained ground coffee beans having an L value of 18.2 were mixed in a ratio of 50 to 50 to obtain the starting material roasted coffee beans having an L value of 26.5. The starting material roasted coffee beans thus obtained (5 g (bulk volume 10.25 cm³)) were placed in an SOT can having an internal volume of 190 cm³ and the opening portion was sealed. After that, the SOT can was charged into an autoclave, and a heat treatment was performed at 125° C. for one hour under pressure of 0.135 MPa in terms of absolute pressure to obtain the roasted coffee beans having an L value of 21.9.

Componential analysis and sensory test of the obtained roasted coffee beans were performed in the same operation as in Example 13. The results are shown in Table 4.

Example 17

Roasted coffee beans having an L value of 34.8 and roasted coffee beans having an L value of 14.8 were separately ground by a grinder. The ground coffee beans, which passed through a 12-mesh Tyler standard sieve and did not pass through a 115-mesh Tyler standard sieve, were separately collected. The obtained ground coffee beans having an L value of 34.8 and the obtained ground coffee beans having an L value of 14.8 were mixed in a ratio of 45 to 55 to obtain starting material roasted coffee beans having an L value of 23.8. The starting material roasted coffee beans thus obtained (5 g (bulk volume 10.25 cm³)) were placed in an SOT can having an internal volume of 190 cm³ and the opening portion was sealed. After that, the SOT can was charged into an autoclave, and a heat treatment was performed at 125° C. for one hour under pressure of 0.135 MPa in terms of absolute pressure to obtain the roasted coffee beans having an L value of 20.2.

Componential analysis and sensory test of the obtained roasted coffee beans were performed in the same operation as in Example 13. The results are shown in Table 4.

Example 18

Roasted coffee beans having an L value of 35.6 and roasted coffee beans having an L value of 18.2 were separately ground by a grinder. The ground coffee beans, which passed through a 12-mesh Tyler standard sieve and did not pass through a 115-mesh Tyler standard sieve, were separately collected. The obtained ground coffee beans having an L value of 35.6 and the obtained ground coffee beans having an L value of 18.2 were mixed in a ratio of 50 to 50 to obtain starting material roasted coffee beans having an L value of 26.9. The starting material roasted coffee beans thus obtained (5 g (bulk volume 10.25 cm³)) were placed in an SOT can having an internal volume of 190 cm³ and the opening portion was sealed. After that, the SOT can was charged into an autoclave and a heat treatment was performed at 125° C. for one hour under pressure of 0.135 MPa in terms of absolute pressure to obtain the roasted coffee beans having an L value of 21.3.

Componential analysis and sensory test of the obtained roasted coffee beans were performed in the same operation as in Example 13. The results are shown in Table 4.

Comparative Example 11

Roasted coffee beans having an L value of 30.1 and roasted coffee beans having an L value of 17.1 were separately ground by a grinder. The ground coffee beans, which passed through a 12-mesh Tyler standard sieve and did not pass through a 115-mesh Tyler standard sieve, were separately collected. The obtained ground coffee beans having an L value of 30.1 and the obtained ground coffee beans having an L value of 17.1 were mixed in a ratio of 44 to 56 to obtain the starting material roasted coffee beans having an L value of 22.8.

Componential analysis and sensory test of the obtained roasted coffee beans were performed in the same operation as in Example 13. The results are shown in Table 4.

Comparative Example 12

Roasted coffee beans having an L value of 34.8 and roasted coffee beans having an L value of 18.2 were separately ground by a grinder. The ground coffee beans, which passed through a 12-mesh Tyler standard sieve and did not pass through a 115-mesh Tyler standard sieve, were separately collected. The obtained ground coffee beans having an L value of 34.8 and the obtained ground coffee beans having an L value of 18.2 were mixed in a ratio of 50 to 50 to obtain the starting material roasted coffee beans having an L value of 26.5.

Componential analysis and sensory test of the obtained roasted coffee beans were performed in the same operation as in Example 13. The results are shown in Table 4.

Comparative Example 13

Roasted coffee beans having an L value of 34.8 and roasted coffee beans having an L value of 14.8 were separately ground by a grinder. The ground coffee beans, which passed through a 12-mesh Tyler standard sieve and did not pass through a 115-mesh Tyler standard sieve, were separately collected. The obtained ground coffee beans having an L value of 34.8 and the obtained ground coffee beans having an L value of 14.8 were mixed in a ratio of 45 to 55 to obtain the starting material roasted coffee beans having an L value of 23.8.

Componential analysis and sensory test of the obtained roasted coffee beans were performed in the same operation as in Example 13. The results are shown in Table 4.

Comparative Example 14

Roasted coffee beans having an L value of 35.6 and roasted coffee beans having an L value of 18.2 were separately ground by a grinder. The ground coffee beans, which passed through a 12-mesh Tyler standard sieve and did not pass through a 115-mesh Tyler standard sieve, were separately collected. The obtained ground coffee beans having an L value of 35.6 and the obtained ground coffee beans having an L value of 18.2 were mixed in a ratio of 50 to 50 to obtain the starting material roasted coffee beans having an L value of 26.9.

Componential analysis and sensory test of the obtained roasted coffee beans were performed in the same operation as in Example 13. The results are shown in Table 4.

TABLE 4

| | | | Example | | | | Comparative Example | | | |
|---|---|---|---|---|---|---|---|---|---|---|
| | | | 15 | 16 | 17 | 18 | 11 | 12 | 13 | 14 |
| Production conditions | L value of starting material roasted coffee beans | | 22.8 | 26.5 | 23.8 | 26.9 | 22.8 | 26.5 | 23.8 | 26.9 |
| | Heat treatment conditions | Temperature (° C.) | 125 | 125 | 125 | 125 | — | — | — | — |
| | | Time (hr) | 1 | 1 | 1 | 1 | — | — | — | — |
| | | Presence or absence of airtight sealing | Present | Present | Present | Present | — | — | — | — |
| | | Ratio of internal volume of container (relative to starting material roasted coffee beans) | 18.5 | 18.5 | 18.5 | 18.5 | — | — | — | — |
| Roasted coffee beans after heat treatment (analysis value) | L value | | 20.1 | 21.9 | 20.2 | 21.3 | — | — | — | — |
| | (A) Hydroquinone content (mg/kg) | | 21.9 | 24.0 | 40.9 | 22.8 | 24.8 | 19.3 | 39.7 | 19.7 |
| | (B) Hydroxyhydroquinone content (mg/kg) | | 33.0 | 20.4 | 16.7 | 19.5 | 150.5 | 137.1 | 142.5 | 141.6 |
| | (C) Chlorogenic acids content (g/100 g) | | 2.684 | 2.593 | 1.994 | 3.147 | 2.724 | 2.650 | 2.048 | 3.103 |
| | Mass ratio (B)/(A) | | 1.51 | 0.85 | 0.41 | 0.86 | 6.27 | 7.10 | 3.59 | 7.19 |
| | Mass ratio [(B)/(C)]* ($\times 10^{-4}$) | | 12.30 | 7.87 | 8.38 | 6.20 | 55.25 | 51.74 | 69.58 | 45.63 |
| Taste and flavor evaluation | Unpleasant taste | | 5 | 5 | 5 | 5 | 2 | 2 | 3 | 2 |
| | Rich taste | | 4 | 5 | 5 | 5 | 4 | 4 | 5 | 4 |

*In the table, the mass ratio [(B)/(C)] value is calculated by multiplying a numerical value shown in a column by $10^{-4}$.

From Tables 3 and 4, it was found that roast coffee beans useful as a starting material for a coffee beverage having not only suppressed unpleasant taste but also rich taste are obtained by separately controlling the L value to be more than 20 and less than 25, the content of component (A) to be 10 mg/kg or more, and the content of component (B) to be 50 mg/kg or less.

The invention claimed is:

1. A product comprising roasted coffee beans, the product having an L value of from more than 20 to 38, a content of (A) hydroquinone per kg of the roasted coffee beans of 7.1 mg or more, a content of (B) hydroxyhydroquinone per kg of the roasted coffee beans of 50 mg or less, and a mass ratio of (B) hydroxyhydroquinone to (A) hydroquinone [(B)/(A)] of from 0.1 to 2.7.

2. The product according to claim 1, wherein (B) hydroxyhydroquinone and (C) chlorogenic acids, are present in a mass ratio [(B)/(C)], of from $0.01 \times 10^{-4}$ to $8 \times 10^{-4}$.

3. The product according to claim 1, wherein chlorogenic acids per 100 g of the product are present in a content of from 1.5 g to 7 g.

4. The product according to claim 1, wherein the content of (A) hydroquinone per kg of the product is 50 mg or less.

5. The product according to claim 1, wherein the content of (B) hydroxyhydroquinone per kg of the product is 0.1 mg or more.

6. The product of claim 1, wherein said product is produced by a process comprising heating roasted coffee beans having an L value of from 21 to 50 in an airtight container at from 100 to 160° C., under standard pressure or at an elevated pressure.

7. The product of claim 1, wherein said product is produced by a process comprising heating roasted coffee beans having an L value of from 21 to 50 in an airtight container at from 120 to 160° C., under standard pressure or at an elevated pressure.

8. The product of claim 1, which is prepared by a process comprising:
   roasting coffee beans at a temperature of from 200 to 300° C., thereby obtaining starting material roasted coffee beans having an L value of from 21 to 50,
   placing the starting material roasted coffee beans in an airtight container,
   charging the starting material roasted coffee beans, in the airtight container, to a heat treating apparatus, and
   heat treating the starting material roasted coffee beans in the heat treating apparatus at a temperature of from 100 to 160° C. under a normal pressure or an elevated pressure for a time of from 0.5 to 4 hours.

9. A process for producing the product of claim 1, comprising placing starting material roasted coffee beans having an L value of from 21 to 50 in an airtight container, and subjecting the roasted coffee beans to a heat treatment at from 100 to 160° C. under a normal pressure or an elevated pressure.

10. The process according to claim 9, wherein a time for the heat treatment is from 0.5 to 4 hours.

11. The process according to claim 10, wherein a heating temperature of the heat treatment is from 100 to 145° C.

12. The process according to claim 10, wherein the L value of the product is more than 20 and 38 or less.

13. The process according to claim 9, wherein a heating temperature of the heat treatment is from 100 to 145° C.

14. The process according to claim 9, wherein an internal volume of the airtight container is from 2 to 30 times as large as a bulk volume of the starting material roasted coffee beans.

15. The process according to claim 9, wherein the L value of the product is more than 20 and 38 or less.

16. The process according to claim 9, wherein the starting material roasted coffee beans are ground.

17. The process according to claim 9, wherein oxygen is present in the airtight container before the heat treatment.

18. The process according to claim 17, wherein an inside of the airtight container is an atmospheric air before the heat treatment.

19. The process according to claim 9, wherein as the starting material roasted coffee beans, roasted coffee beans having an L value larger by from 5 to 10 than a desired L value are used.

* * * * *